(12) United States Patent
Wang et al.

(10) Patent No.: US 7,852,536 B2
(45) Date of Patent: Dec. 14, 2010

(54) ANGLE AVOIDANCE FOR COLOR HALFTONE SCREENS

(75) Inventors: Shen-ge Wang, Fairport, NY (US); Beilei Xu, Penfield, NY (US); Robert Paul Loce, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1640 days.

(21) Appl. No.: 11/108,497

(22) Filed: Apr. 18, 2005

(65) Prior Publication Data

US 2006/0232822 A1 Oct. 19, 2006

(51) Int. Cl.
*H04N 1/46* (2006.01)

(52) U.S. Cl. .................. 358/536; 358/1.9; 358/534; 358/3.26; 358/533; 358/497; 359/891

(58) Field of Classification Search .................. 358/518, 358/3.23, 530, 523–525, 1.13, 1.1, 1.14, 358/1.15, 1.9; 709/217, 224, 223, 249, 238
See application file for complete search history.

(56) References Cited

U.S. PATENT DOCUMENTS

| | | | |
|---|---|---|---|
| 3,710,019 A | 1/1973 | Hell et al. | |
| 4,537,470 A | 8/1985 | Schoppmeyer | |
| 5,381,247 A | 1/1995 | Hains | |
| 6,798,539 B1 | 9/2004 | Wang et al. | |
| 7,133,161 B2 * | 11/2006 | Xu et al. | 358/3.26 |
| 2002/0089708 A1 * | 7/2002 | Cheng et al. | 358/534 |
| 2004/0109184 A1 * | 6/2004 | Ishii | 358/1.9 |

FOREIGN PATENT DOCUMENTS

JP 2000-152015 5/2000

OTHER PUBLICATIONS

Amidror, et al., "Spectral analysis and minimization of moiré patterns in color separation," Journal of Electronic Imaging, Jul. 1994, vol. 3(3), pp. 295-317.
A machine generated translation of JP 2000-152015.

* cited by examiner

*Primary Examiner*—Twyler L. Haskins
*Assistant Examiner*—Brendan McCommas
(74) *Attorney, Agent, or Firm*—Fay Sharpe LLP

(57) ABSTRACT

A method for avoiding objectionable moiré in a color image can include identifying a problematic excitation angle associated with a problematic excitation in a marking process or in the color image and selecting a set of at least two halftone screens for rendering at least two separations of the color image wherein the set of screens is selected to avoid including significant screen fundamental, harmonic and beat frequencies at angles closer than about 1 degree of the identified problematic excitation angle. Halftoning the color image according to the selected set of screens avoids objectionable moiré associated with the problematic excitation.

23 Claims, 5 Drawing Sheets

ANGLE AVOIDANCE FOR COLOR HALFTONE SCREENS

BACKGROUND

The methods, systems and halftone screen sets illustrated herein in embodiments are related generally to the art of halftoning images. More specifically, embodiments are related to methods for selecting sets of halftone screens that do not generate objectionable moiré when interacting with a problematic excitation associated with a rendering device or an image. Embodiments disclosed herein include image processors that include such screens and are adapted to apply them. Additionally, specific screen sets for avoiding objectionable moiré when combined with specific problematic excitations are disclosed. Embodiments will be described with reference to marking engines or printers. However, embodiments will find application in other imaging systems that use halftoning to render an image.

Digital imaging systems, including, for example, ink jet, electrophotographic and xerographic printing or rendering environments can include a number of intentional and unintentional periodicities in their rendering processes. For example, many raster output scanners associated with electrophotographic and xerographic marking engines include a rotating polygonal mirror. One or more laser beams are reflected off of facets of the rotating mirror onto an imaging surface. Imperfections in the mirrors, the mirrors' alignment, and the rate at which the mirror is rotated can affect the position and focus of the reflected beam with the periodicity of the mirror rotation. The cyclic nature of gears associated, for example, with moving an ink jet print head or with transporting print media, also contributes periodicities to the rendering process. Additionally, where print media is transported by or processed by rolls, roll run-out or imperfections in the shape or alignment of the rolls can contribute periodic variations in the rendering process. For instance, roll run-out imperfections may create variation to development pressure and/or in-media transportation speed. Furthermore, subtle accelerations and decelerations are associated with points in time of positive gear-tooth engagement and disengagement (or backlash).

In the best of situations, these periodic excitations occur at frequencies that are high enough to be imperceptible by the human vision system. However, even excitations that are themselves at an imperceptively high frequency can combine or beat with other imaging excitations to produce perceptible banding or moiré artifacts in a rendered image. For example, problematic rendering excitations can combine with fundamental, harmonic and beat frequencies associated with halftone screens used in the rendering process.

In monochrome or black and white rendering applications, wherein only one halftone screen is used, it is fairly simple to select a halftone screen that does not include excitations (i.e., fundamental, harmonic and beat frequencies) in the same direction or at the same angle as one or more known problematic excitations. However, in color rendering, wherein two or more halftone screens are used (one for each separation), it is difficult to find a set of halftone screens that avoid including excitations (i.e., fundamentals, harmonics and beats) that avoid the direction or angle of a problematic excitation.

Indeed, a great deal of effort has been spent to solve the lesser problem of finding sets of halftone screens for rendering color that do not produce objectionable moiré due to beats between frequency components of the screens themselves. For example, see Spectral Analysis and Minimization of Moiré Patterns in Color Separation by Amidror, Hersch and Ostromoukhov in the Journal of Electronic Imaging, Vol. 3, no. 3, pages 295-317 (July 1994). U.S. Pat. No. 5,381,247 to Hains for a Method for Reducing Two-Color Moiré in Four-Color printing, which issued Jan. 10, 1995; U.S. Pat. No. 4,537,470 to Schoppmeyer for Screen Systems for Multicolor Printing, which issued Aug. 27, 1985; U.S. Pat. No. 5,381,247 to Hains for a Method for Reducing Two-Color Moiré in Four-Color Printing, which issued Jan. 10, 1995; and U.S. Pat. No. 6,798,539 B1 to Wang, et al. for a method for moiré-free color halftoning using non-orthogonal cluster screens, which issued Sep. 28, 2004.

Therefore, there has been a desire for methods for selecting sets of halftone screens for rendering separations of a color image that avoid excitations in directions near a direction of a problematic excitation, for screens that meet that criteria, and for imaging systems that render images through the use of halftone screens that meet that criteria.

BRIEF DESCRIPTION

Aspects of the present disclosure in embodiments thereof include systems, methods and halftone screens for avoiding objectionable moiré in a color image.

For instance methods can include identifying a problematic excitation angle associated with a problematic excitation in a marking process or in the color image, selecting a set of at least two halftone screens for rendering at least two separations of the color image wherein the set of screens is selected to avoid including significant screen fundamental, harmonic and beat frequencies at angles closer than about 1 degree of the identified problematic excitation angle and halftoning the color image according to the selected set of screens.

Methods for selecting a set of halftone screens for halftoning a color image can include identifying a problematic excitation in a marking process or in the color image, identifying an available pixel grid to be used to render the image, identifying screens that are compatible with the available pixel grid, selecting at least two candidate screens from the identified screens, determining selected respective vector sums of respective combinations of fundamental and/or harmonic frequency components, of the selected at least two candidate screens, determining if respective angles of the respective vector sums are separated by at least about one degree from the problematic excitation angle and selecting the set of candidate screens if respective angles of the respective vector sums are separated by at least about one degree from the problematic excitation angle.

A set of halftone screens for avoiding objectionable moiré when used in conjunction with a problematic excitation can include a first screen having respective first screen fundamental frequencies, respective first screen harmonics and respective first screen angles associated with the respective first screen fundamental frequencies and harmonics and a second screen having respective second screen fundamental frequencies, respective second screen harmonics and respective second screen angles associated with the respective second screen fundamental frequencies and harmonics, wherein the respective first and second screen angles are separated from an angle of the problematic excitation by at least about 1 degree, and wherein angles of beats, between any of the first and second screen fundamentals and harmonics that would otherwise beat with the problematic excitation at visually objectionable frequencies, are separated from the angle of the problematic excitation by at least about 1 degree.

One such set of halftone screens includes a first screen has a first screen fundamental frequency of 160.1 cycles per inch and an first screen angle of 38.7 degrees and a second screen fundamental frequency of 187.5 cycles per inch and a second screen angle of −53.1 degrees, the second screen has a first screen fundamental frequency of 164.4 cycles per inch and an first screen angle of −70.1 degrees and a second screen fundamental frequency of 175.3 cycles per inch and a second screen angle of 5.1 degrees and a third screen has a first screen fundamental frequency of 187.6 cycles per inch and an first screen angle of −17.1 degrees and a second screen fundamental frequency of 176.8 cycles per inch and a second screen angle of 69.4 degrees. This set of screens avoids objectionable moiré where a problematic excitation is at 0 degrees.

A color image processing system can include a set of halftone screens including a first screen having respective first screen fundamental frequencies, respective first screen harmonics and respective first screen fundamental and harmonic angles associated with the respective first screen fundamental frequencies and harmonics and a second screen having respective second screen fundamental frequencies, respective second screen harmonics and respective second screen fundamental and harmonic angles associated with the respective second screen fundamental frequencies and harmonics, wherein the respective first and second screen fundamental and harmonic angles are separated from an angle of a problematic excitation by at least about 1 degree, and wherein angles of beats between any of the first and second screen fundamentals and harmonics that would otherwise beat with the problematic excitation in a visually objectionable manner, are separated from the angle of the problematic excitation by at least about 1 degree. Additionally the system can include a halftoner that is operative to prepare the color image for rendering by a rendering device by using the set of halftone screens to halftone the image.

DETAILED DESCRIPTION

A monochrome example helps illustrate relevant principles. Referring to an enlarged bit map of a gray level sweep halftone 110 generated with a 45° clustered dot halftone screen clearly illustrates fundamental 114, 118 and harmonic (e.g., 122, 126) periodicities. By Fourier frequency analysis, it can be understood that the halftone pattern in FIG. 1 contains two fundamental frequencies, one each at positive (114) and negative (118) 45°, as well as many high-order harmonic components (e.g., 122, 126) in the two-dimensional frequency space.

Figure 2:
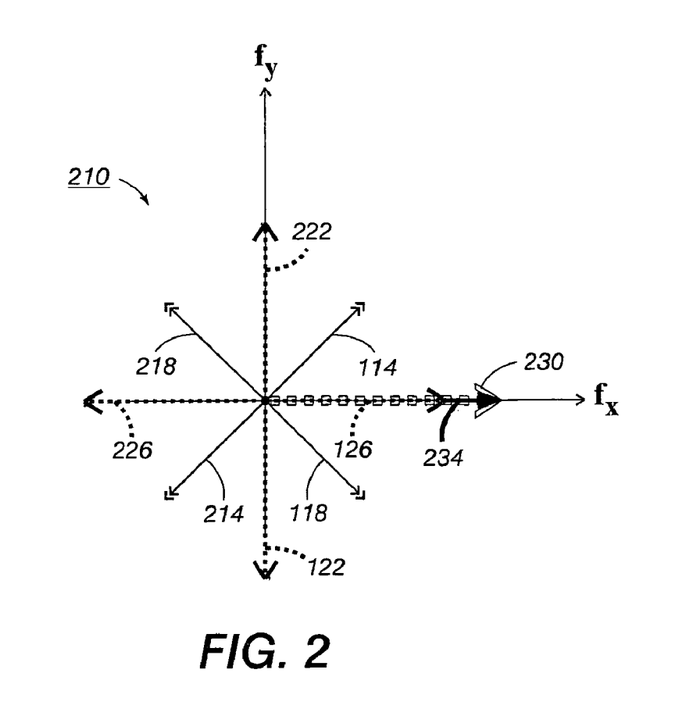
FIG. 2 is a simplified vector diagram of the screen of FIG. 1.

Referring to FIG. 2, a vector representation 210 shows the two fundamental frequency components (114, 118) and their negative conjugates (214, 218), and a few high-order harmonics 122, 222, 126, 226, including one at 0° 126. When there is a problematic excitation 230, for example, from a printer or image at 0°, a beat between the problematic excitation and the halftone screen excitation (e.g., 126) at 0° may include a visually observable low-frequency component 234 and may be perceived as visually objectionable banding or moiré artifact.

By using a different halftone screen that, in effect, "rotates" the fundamental frequencies of the halftone screen (of FIG. 1) by about, for example, 3°, it can be observed on prints that perceived screen to problematic excitation beat-based banding is essentially eliminated.

Figure 1:
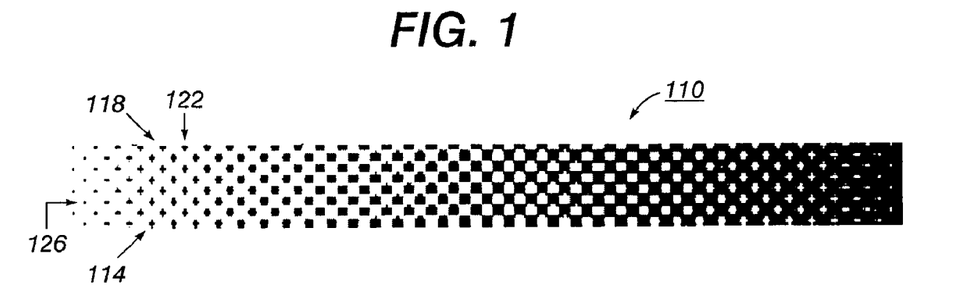
FIG. 1 is an enlarged view of a density sweep rendered through a 45° dot screen.
Figure 3:
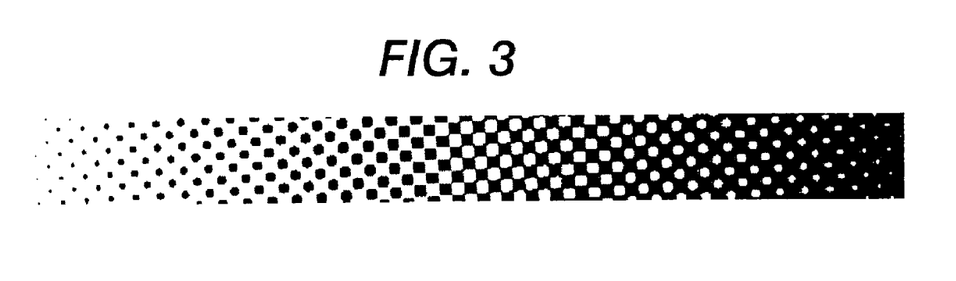
FIG. 3 is an enlarged view of a density sweep rendered through a rotated version of the screen of FIG. 1.
Figure 4:
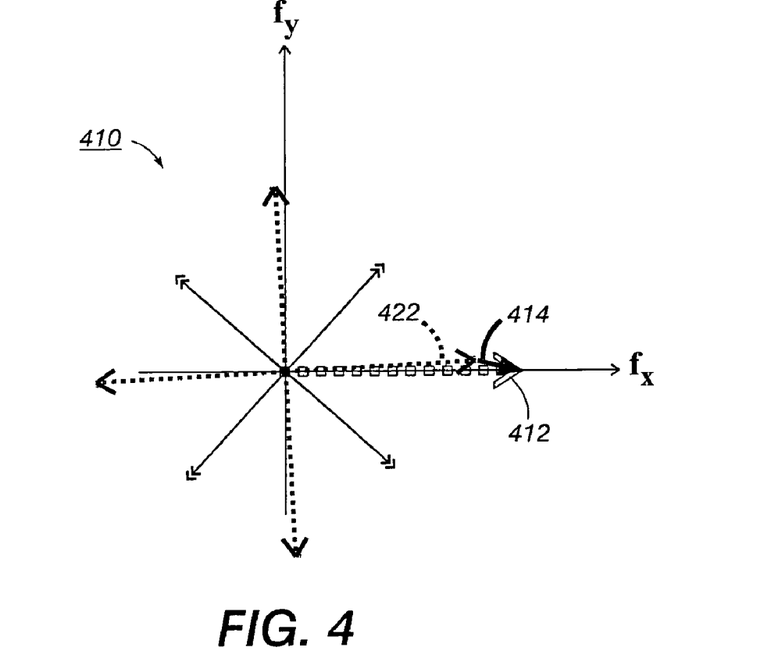
FIG. 4 is a simplified vector diagram of the screen of FIG. 3.

FIG. 3 shows a sweep similar to that of FIG. 1. However, in the case of FIG. 3, the halftone screen used is rotated by 3° from the one used in FIG. 1. FIG. 4 shows a vector representation 410 of this halftone and a 0° problematic 412 excitation. Although the magnitude (vector length) of the beat 414 between the problematic excitation 412 and the halftone screen harmonic 422 is similar to the beat 234 magnitude in FIG. 2, no banding is observed on prints rendered with the rotated screen.

As the number of halftone screens used is increased, for example, to allow for halftoning multiple separations of a color image, the problem of finding a set of screens that excludes excitations that avoid an angle of a problematic excitation becomes far more complicated. When a plurality of screens is used, fundamentals and harmonics of each screen of the plurality must be considered. Moreover, beats between the fundamentals and harmonics of a first screen and fundamentals and harmonics of a second and/or third or fourth screen, and beats between the beats, create a multitude of excitations that can be in alignment with the problematic excitation.

Figure 5:
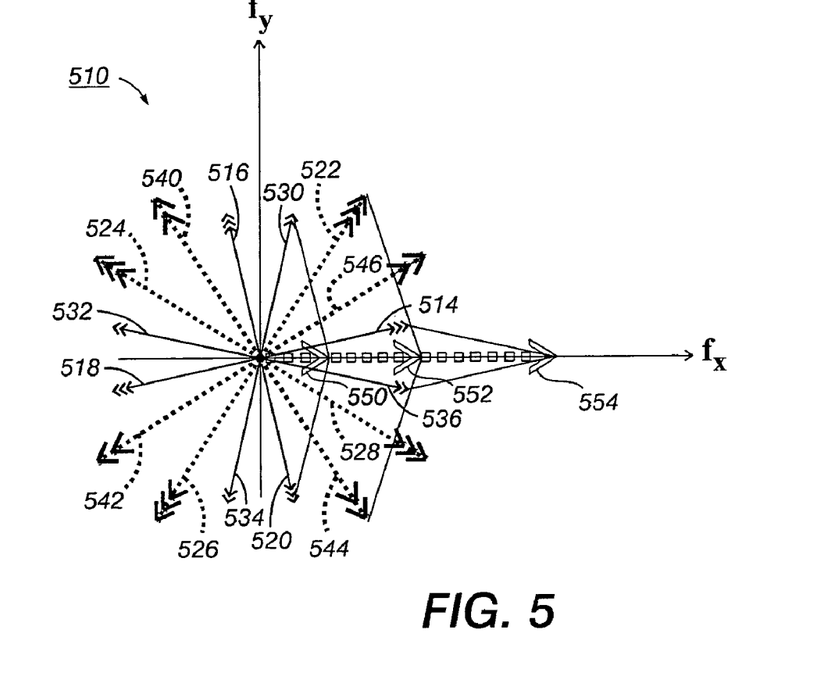
FIG. 5 is a simplified vector diagram of a 15° screen and a 75° screen.

Referring to FIG. 5, even an abbreviated or simplified vector diagram 510 showing fundamental 514, 516, 518, 520 and first-order harmonics 522, 524, 526, 528 of, for example, a typical 15° Cyan screen and fundamental 530, 532, 534, 536 and first-order harmonics 540, 542, 544, 546 of a 75° halftone screen for a Magenta separation, illustrates the frequency or excitation-rich environment created by the use of multiple halftone screens and the difficulty associated with finding sets of halftone screens that do not include excitations in a direction or angle of a problematic excitation in color applications. For example, while the fundamentals and first harmonics 514-546 of the Cyan and Magenta screens do not include components or excitations at 0° (a typical direction of rendering system-based problematic excitations), component excitations (e.g., 520, 530; 522, 544 and 514, 536) interact to produce beats 550, 552, 554 that are in direction of the problematic excitation (i.e., at 0°).

The problem of finding a set of screens that avoids or does not include or generate an excitation in a direction near a direction of a problematic excitation is further complicated by the fact that the set of usable halftone screens is limited by an available pixel grid associated with a rendering device (e.g., see FIG. 10) to be used to render an image. For instance, a typical rendering device can produce marks at a spatial resolution of 600 spots per inch. Even typical high-end marking engines are currently limited to a pixel grid spatial resolution of about 2,400 spots per inch. Therefore, the angular resolution with which screens, such as the Cyan and Magenta screens discussed above (with reference to FIG. 5), can be rotated is relatively course. The available pixel grid may not support rotating a set of two or more halftone screens by 1, 2 or 3 degrees. While larger rotations may be possible, and would likely separate the beats 550, 552, 554 from the problematic excitation a sufficient amount to render the beats 550, 552, 554 visually unobjectionable, it is likely that other beats would be rotated into close proximity with the problematic excitation and would become visually objectionable.

This problem is further aggravated when one considers second-, third-, fourth- and higher-order harmonics of the Cyan and Magenta screens which are not included in the simplified vector diagram 510.

Additionally, color images are usually rendered with 3, 4 or more separations or colorants associated with 3, 4 or more halftone screens. For instance, the addition of halftone screens for a black and/or yellow colorant makes the problem of finding a set of screens that does not include an excitation in a direction or at an angle of a problematic excitation even more difficult. Nevertheless, sets of halftone screens for rendering color images that avoid or do not include excitations (fundamentals, harmonics and beats) in directions or at angles near a direction or angle of a problematic excitation can be found.

Figure 6:
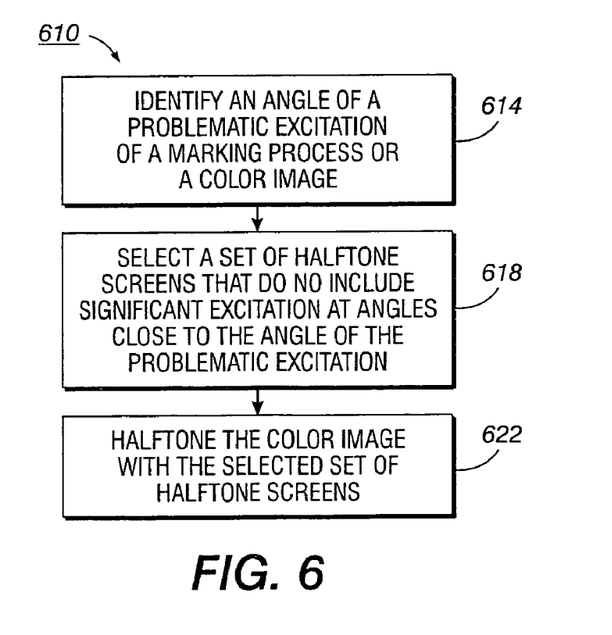
FIG. 6-FIG. 8 are flow charts outlining aspects of methods for avoiding objectionable moiré.

Referring to FIG. 6, a method 610 for avoiding objectionable moiré in a color image can include identifying 614 an angle of a problematic excitation of a marking process or a color image, selecting 618 a set of halftone screens that do not include significant excitations (fundamentals, harmonics and beats) at angles close to the angle of the problematic excitation and halftoning 622 the color image with the selected set of halftone screens.

Identifying 614 an angle of a problematic excitation can occur, for example, at system design time or at commissioning. For example, excitations associated with the operation of a raster output scanner (ROS) or other marking engine or rendering device systems or components can be noted and identified as problematic. An angle of the problematic excitation can be calculated or measured. Additionally, or alternatively, identifying 614 an angle of a problematic excitation can include analyzing an image to be rendered. For example, the image may include a pattern, such as a fabric weave or decorative patterns in imaged wall paper or carpeting. Additionally, or alternatively, the image may be a scanned halftoned image and include a problematic excitation associated with an original halftone screen of the scanned image or associated with a pixel grid of an image scanner.

Figure 7:
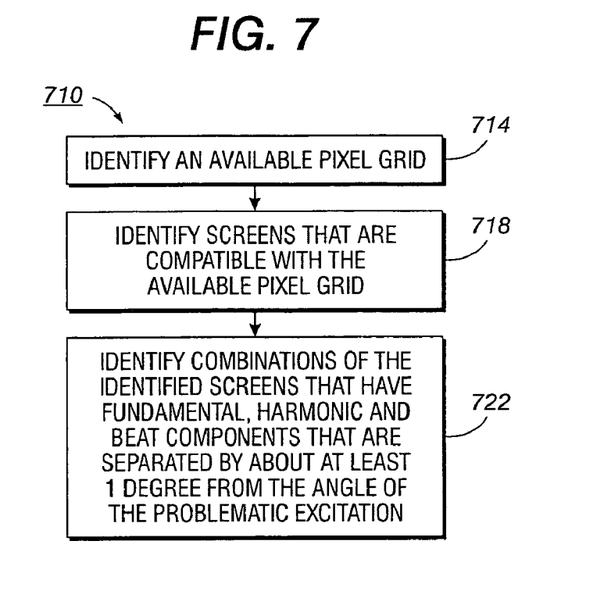

Selecting 618 a set of halftone screens that do not include significant (i.e., those that would be, or would interact with other excitations to become, visually objectionable) excitations (e.g., fundamentals, harmonics and beats) at angles close to the angle of the problematic excitation can include a screen set search process. For instance, an illustrative search process 710 can include identifying 714 an available pixel grid, identifying 718 screens that are compatible with the available pixel grid and identifying 722 combinations of the identified screens that have fundamental, harmonic and beat components that are separated by at least about 1° from the identified 614 angle of the problematic excitation.

Identifying 714 the available pixel grid may occur when a marking engine is selected for rendering the image. This may occur at system design time, commissioning, or when image or document production is scheduled. For instance, an image processing system may include a plurality of marking engines with different capabilities and different available pixel grids.

Identifying 718 screens that are compatible with the available pixel grid can include identifying halftone screens that have structures that align with the spots that can be rendered by the available pixel grid. For instance, spots or pixel positions within a halftone cell of a candidate screen must align with markable pixel positions associated with the available pixel grid. More screens will be compatible with a pixel grid having a resolution of 2400 spots per inch than will be compatible with a 600 spot per inch pixel grid. Orthogonal and non-orthogonal halftone screens may be considered. However, it is anticipated that the likelihood that a set of halftone screens does not include excitations at angles close to the angle of the problematic excitation increases if the set of halftone screens being considered includes one or more non-orthogonal screens.

Additionally, it is anticipated that non-orthogonal screens that are within about 8° of orthogonality may be beneficially considered. Considering screens near 15°, 45° and 75° (within about 8°) is anticipated to be fruitful. Furthermore, experience indicates that screens with fundamental frequencies in the range of about 160 to about 190 cycles per inch (cpi) are appropriate to consider. Limiting the number of subcells in candidate screens to about $\leq 4$ may also provide some benefit.

Screens of any geometry may be considered including, but not limited to, line screens and dot screens. However, it is anticipated that the likelihood that a set of halftone screens does not include significant excitations at angles close to the angle of the problematic excitation increases if the set of halftone screens being considered includes one or more line screens.

It may be beneficial to identify 718 screens that are compatible with the available pixel grid and have additional desirable characteristics. For instance, screens that include fundamental frequencies below about 100 dots per inch begin to be perceivable by the human vision system. While low-frequency screens may be selected for artistic or other reasons, it may be beneficial to limit the identified 718 screens to those that include fundamental frequency components above some threshold or to otherwise limit the pool of candidate screens.

Identifying 722 combinations of the identified 718 screens that have fundamental, harmonic and beat components that are separated by at least about 1° from the angle of the problematic excitation can include a screen-by-screen or combination-by-combination analysis. For example, referring to FIG. 8, a method 810 for identifying combinations of screens that do not include significant excitations at angles close a problematic excitation can include selecting 814 at least two candidate screens, determining 818 respective vector sums of respective combinations of fundamental, harmonic and/or beat components of the selected at least two candidate screens, determining 822 if respective angles of the respective vector sums are separated by at least about 1° from the angle of the problematic excitation and selecting 826 the set of candidate screens if the respective angles of the respective vector sums are separated by at least about 1° from the angle of the problematic excitation.

Figure 8:
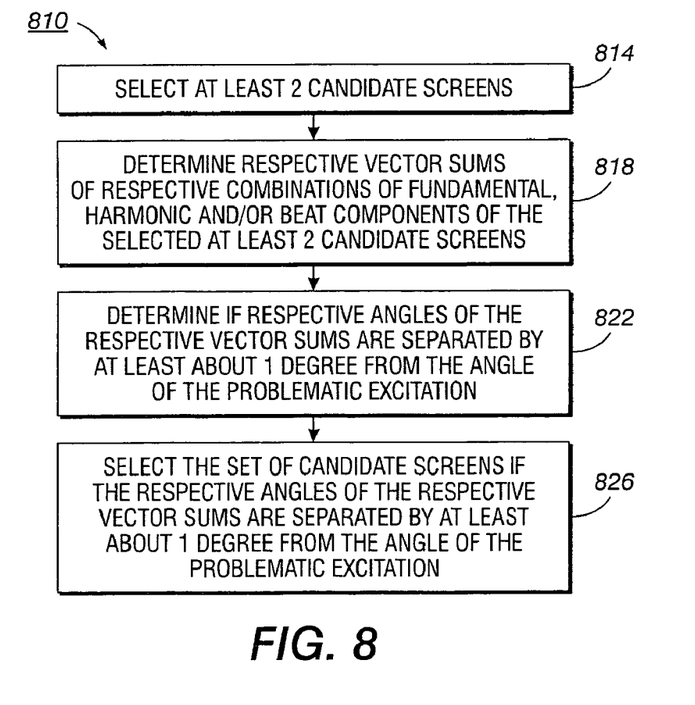

Selecting 814 at least two candidate screens includes selecting two of the identified 718 screens that are compatible with the available pixel grid. It may be appropriate to select just two candidate screens when the image to be rendered is to be rendered with just two colorants. For example, a first colorant and a highlight colorant. However, in many instances, selecting at least two screens includes selecting three or more screens. For example, three screens may be selected in association with Cyan (C), Magenta (M) and Black (K) separations of an image or colorants to be used in rendering the image. Additionally, or alternatively, selecting 814 at least two candidate screens can include selecting a fourth screen in association with, for example, a yellow separation or colorant, or selecting 814 additional screens to accommodate Hi-Fi color image rendering. Selecting 814 at least two candidate screens may also include selecting a set of candidate screens that are determined or known to possess otherwise desirable moiré characteristics. That is, it may be appropriate to limit the set of candidate screens to those screens known, or determined, to exhibit acceptable moiré characteristics in and of themselves. For instance, otherwise acceptable moiré characteristics typically means that fundamental, harmonic and beats between the screens of a selected set are only at frequencies that are sufficiently high or sufficiently low so as to not be visually objectionable. For instance, in some cases beat frequencies below one-third of a cycle per inch (cpi) or above 50 cycles per inch (cpi) are considered visually unobjectionable. However, other frequency ranges may be appropriate for a given printer and other moiré constraints may be deemed appropriate by different system operators or image observers.

Determining 818 respective vector sums of respective combinations of fundamental, harmonic and/or beat components of the selected at least two candidate screens and determining 822 if respective angles of the respective vector sums are separated by at least about 1° from the angle of the problematic excitation can include considering individual fundamental components of individual screens, integer multiples of individual fundamental components of individual screens, combinations or harmonics of fundamental frequency components of individual screens, combinations or harmonics of integer multiples of individual components of individual screens, and combinations or beats between fundamental and/or harmonic components of two or more candidate screens.

For example, where three candidate screens are selected 814 in association with three separations or colorants (for example, Cyan, Magenta and Black (C, M, K)) determining 818 respective vector sums may proceed according to an expression such as:

Let vector sum $B = n_1 C_1 + n_2 C_2 + n_3 M_1 + n_4 M_2 + n_5 K_1 + n_6 K_2$, (1)

wherein $C_1$, $C_2$, $M_1$, $M_2$, $K_1$ and $K_2$ are respective first and second vectors representing first and second fundamental frequency components of candidate halftone screens associated with Cyan, Magenta and Black separations or colorants, respectively, $n_1$, $n_2$, $n_3$, $n_4$, $n_5$ and $n_6$ are individual integer coefficients of $C_1$, $C_2$, $M_1$, $M_2$, $K_1$ and $K_2$, respectively, wherein $n_i$ (e.g., $n_1$-$n_6$) may theoretically range from minus infinity to plus infinity but in practical applications may range from −24 to +24, −6 to +6, or over an even narrower range.

The fundamental component vectors (e.g., $C_1$, $C_2$, $M_1$, $M_2$, $K_1$ and $K_2$) represent fundamental frequencies and angles associated with their respective candidate screens. When the integer coefficients ($n_i$) are non-zero, they reference co-linear harmonics of the individual fundamental components ($C_1$, $C_2$, $M_1$, $M_2$, $K_1$ and $K_2$). When a given $n_i$ is equal to 0, it removes its associated individual fundamental component from consideration in the current vector sum.

As indicated above, vector sums B can be determined 818 for any and all combinations of integer values for $n_i$. However, experiments indicate that vector sums B need only be determined for values of $n_i$ wherein the product of $n_i$ and its associated fundamental component do not exceed the resolution of the identified 714 available pixel grid. For example, where the identified available pixel grid has a resolution of 600 spots per inch and where $C_1$ is associated with a spatial frequency of 150 spots per inch, it may only be necessary to determine 818 vector sums associated with values of $n_1$ that range from −4 to +4, because the quotient of 5×150 spots per inch is equal to 750 spots per inch, which exceeds the spatial resolution of the available pixel grid (600 spots per inch).

Determining 822 if respective angles of the respective determined 818 vector sums are separated by at least about 1° from the angle of the problematic excitation can include applying an angle avoidance criterion to each vector sum (e.g., B). For example, the angle avoidance criterion can be represented by an expression such as:

$|\arctan(B_y/B_x) - \epsilon| > \text{Angle\_tolerance}$, (2)

where $B_y$ and $B_x$ are x and y components of vector B, $\epsilon$ is the angle of the problematic excitation and the Angle_tolerance can be selected to be about 1° or greater.

In summary, after individual screens are identified 718, 814 as candidates, vector sums of screen combinations (screen sets) are determined via, for example, Eq. (1). The screen combination frequency vectors represent fundamental frequencies, harmonics, and beats (linear combination of frequency vectors of screens of different separations). Some of the beats have common names, for instance, the terms 2-color moiré and 3-color moiré often refer to beats between fundamental frequencies of two and three colors, respectively. Equation (1) determines 818 vector sums of these common moirés (beats) as well as more subtle, higher-order moirés that may be considered when attempting to achieve high quality results. The screen combination frequency vector sums are then evaluated according to Eq. (2) to determine if they meet the angle avoidance criteria. If the screen set does meet these criteria, the set may be selected 816, 618 for further processing. For example, the set of screens may be used to halftone 622 the color image. Alternatively, the set of candidate screens may be compared to other sets of candidate screens (which meet the angle avoidance criteria) and evaluated for other factors, such as spot function optimization for preferred tone reproduction curves.

At least one embodiment of the above described methods has been used to select a set of screens that avoid including excitations near a 0° angle of problematic excitations. Specifications of one set of screens that avoid excitations at that angle include:

$C_1$: 160.1 cpi, 38.7° and $C_2$: 187.5 cpi, −53.1°;
$M_2$: 175.3 cpi, 5.1° and $M_1$: 164.4 cpi, −70.7°;
$K_1$: 187.6 cpi, −17.1° and $K_2$: 176.8 cpi, 69.4°.

The three-color combination of the above described screens also meet a perfect zero-moiré condition, i.e., $C_1 + M_1 + K_1 = 0$, and $C_2 + M_2 + K_2 = 0$.

Figure 9:
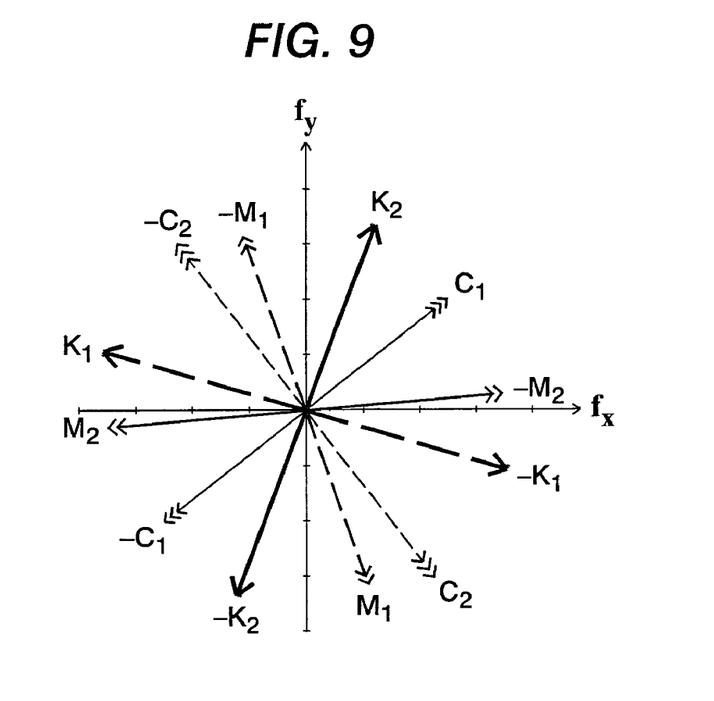
FIG. 9 is a simplified vector diagram of a set of 3 screens that avoid objectionable moiré when associated with a problematic excitation having an angle of 0°.

Also, all two-color (two-screen) combinations yield beat frequencies greater than 58 lines per inch (lpi). There is no frequency component, by a single channel or color combination, that falls within ±5° with respect to the 0° axis or the angle of the problematic excitation. A simplified frequency vector representation of this screen set is shown in FIG. 9.

Figure 10:
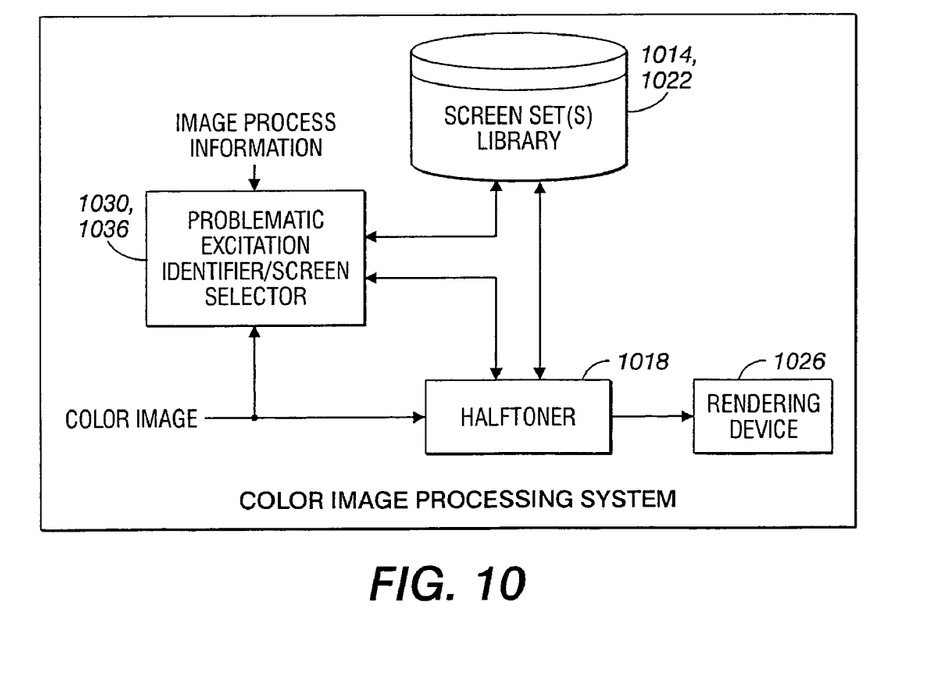
FIG. 10 is a block diagram of a color image processing system.

Referring to FIG. 10, a color image processing system 1010 that is operative to halftone a color image in a manner that avoids objectionable moiré associated with a problematic excitation can include a set 1014 of halftone screens, that avoid or do not include excitations at angles near an angle of the problematic excitation, and a halftoner 1018 that is operative to prepare the color image for rendering via a rendering device using the set of halftone screens 1014. For example, the set of halftone screens 1014 may be included in a plurality or library 1022 of halftone screen sets. Alternatively, the set of halftone screens 1014 may be the only set included in the system 1010.

For example, the screen set 1014 includes at least a first screen and a second screen. The first screen has or is associated with respective first screen fundamental frequencies, respective first screen harmonics as well as respective first screen fundamental and harmonic angles that are associated with the respective first screen fundamental frequencies and harmonics. Similarly, the second screen has or is associated with respective second screen fundamental frequencies, respective second screen harmonics and respective second screen fundamental and harmonic angles that are associated with the respective second screen fundamental frequencies and harmonics. The respective first and second screen fundamental and harmonic angles are separated from an angle of a problematic excitation by at least about 1°. Additionally, angles of beats between any of the first and second screen fundamentals and harmonics that would otherwise beat with the problematic excitation in a visually objectionable manner are separated from the angle of the problematic excitation by at least about 1°.

The set 1014 of screens can include additional screens. For example, the set 1014 can include a third or a plurality of additional screens. In those cases, the respective first, second and third or plurality of screen fundamental and harmonic angles are separated from the angle of the problematic excitation by at least about 1°. Additionally, angles of beats between any of the first, second and third or plurality of screen fundamentals, harmonics and beats thereof, that would otherwise beat with the problematic excitation in a visually objectionable manner, are separated from the angle of the problematic excitation by at least about 1°.

For example, where an angle of the problematic excitation is 0°, the set 1014 of screens might include a first screen fundamental frequency of 160.1 cycles per inch and a first screen angle of 38.7° and a second fundamental frequency of 187.5 cycles per inch and a second screen angle of −53.1°. The set 1014 of screens might also include a second screen having a first screen fundamental frequency of 164.4 cycles per inch and a first screen angle of −70.1° and a second screen fundamental frequency of 175.3 cycles per inch and a second screen angle of 5.1°. The set 1014 of screens might also include a third screen having a first screen fundamental frequency of 187.6 cycles per inch and a first screen angle of −17.1° and a second screen fundamental frequency of 176.8 cycles per inch and a second screen angle of 69.4°.

Optionally, the color image processing system 1014 can include a rendering device 1026 and/or a problematic excitation identifier 1030 and screen selector 1036.

For instance, the rendering device 1026 can include one or more marking engines, such as, for example, ink jet, electrophotographic or xerographic marking engines. Additionally, or alternatively, the rendering device 1026 can include one or more display devices, such as cathode ray tubes (CRTs), liquid crystal displays (LCDs) and/or plasma displays. Where the color image processing system 1010 includes a rendering device 1026, the screen set 1014 can be selected 814, 826 from screens identified 718 to be compatible with an identified 714 pixel grid of the rendering device 1026. Where the system 1010 does not include a rendering device, the screen set 1014 or library of screen sets 1022 can be included in the color image processing system 1010 in anticipation of potential available pixel grid resolutions, such as, for example, 600 spi, 1200 spi and 2400 spi, where spi refers to spots per inch, i.e. pixels per inch.

The problematic excitation identifier 1030 can be operative to identify 614 the problematic excitation from an aspect of the image process, rendering device or from the color image itself. For example, the problematic excitation identifier 1030 may receive input from a system designer or system operator indicating aspects of the problematic excitation. Alternatively, the problematic excitation identifier 1030 may orchestrate the production and analysis of test prints for identifying 614 problematic excitations associated with the image processing system or rendering device (e.g., 1026). Additionally, or alternatively, the problematic excitation identifier 1030 may examine color image data and identify 614 a problematic excitation within the color image itself. For instance, the problematic excitation identifier 1030 may identify 614 frequencies and angles associated with an original halftone screen of a rescanned or otherwise halftoned image. Additionally, or alternatively, the problematic excitation identifier 1030 may analyze subject matter of the image in a search for problematic excitations, such as repeated patterns in the subject matter of the image. If, or when, the problematic excitation identifier 1030 identifies 614 a problematic excitation, it may pass problematic excitation identification information to the screen selector 1036.

The screen selector 1036 may be operative to select 618, 826 a set of screens (e.g., 1014) from the library 1022 of screen sets based on the identification 614 of the problematic excitation provided by the problematic excitation identifier 1030.

The screen set 1014 or library 1022 may be implemented in any known computer storage medium such as rotating media, random access memory (RAM), read only memory (ROM), EEPROM, FLASH or other devices.

The halftoner 1018, the problematic excitation identifier 1030 and the screen selector 1036 may be implemented in various combinations of hardware and software.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for avoiding objectionable moiré in a color image, the method comprising:
   identifying a problematic excitation angle associated with a problematic excitation in a marking process or in the color image;
   selecting a set of at least two halftone screens for rendering at least two separations of the color image wherein the set of screens is selected to avoid including significant screen fundamental, harmonic and beat frequencies at angles closer than about 1 degree of the identified problematic excitation angle; and
   halftoning the color image according to the selected set of screens.

2. The method of claim 1 wherein identifying a problematic excitation angle comprises:
   identifying at least one of an angle of about zero degrees from a process direction and an angle of about zero degrees from a cross-process direction of the marking process.

3. The method of claim 1 wherein selecting a set of at least two halftone screens comprises:
   selecting one of a set of three halftone screens and a set of four halftone screens.

4. The method of claim 1 wherein selecting a set of at least two halftone screens comprises:
   identifying an available pixel grid to be used to render the image;

identifying screens that are compatible with the available pixel grid;

identifying combinations of the identified screens that have fundamental, harmonic and beat frequencies that would otherwise beat with the problematic excitation in a visually objectionable manner, only at angles that are separated by at least about 1 degree from the problematic excitation angle; and selecting a combination of screens so identified to be the selected set of screens.

5. The method of claim 1 wherein selecting a set of at least two halftone screens comprises:

identifying an available pixel grid to be used to render the image;

identifying screens that are compatible with the available pixel grid;

selecting at least two candidate screens from the identified screens;

determining respective vector sums of respective combinations of fundamental, harmonic and or beat frequencies of the selected at least two candidate screens;

determining if respective angles of the vector sums are separated by at least about one degree from the problematic excitation angle; and selecting the set of candidate screens if respective angles of the respective vector sums are separated by at least about one degree from the problematic excitation angle.

6. The method of claim 5 wherein selecting at least two candidate screens comprises:

selecting at least two screens having respective screen frequencies and screen angles that do not combine to produce objectionable moiré.

7. The method of claim 6 wherein selecting at least two screens having respective screen frequencies and screen angles that do not combine to produce objectionable moiré comprises:

selecting at least three screens that meet a perfect zero frequency moiré condition.

8. The method of claim 1 wherein selecting a set of at least two halftone screens comprises:

at least one of selecting at least two dot screens and selecting at least one non-orthogonal screen.

9. A method for selecting a set of halftone screens for halftoning a color image, the method comprising:

identifying a problematic excitation in a marking process or in the color image;

identifying an available pixel grid to be used to render the image;

identifying screens that are compatible with the available pixel grid;

selecting at least two candidate screens from the identified screens;

determining selected respective vector sums of respective combinations of fundamental and/or harmonic frequency components, of the selected at least two candidate screens;

determining if respective angles of the respective vector sums are separated by at least about one degree from the problematic excitation angle; and selecting the set of candidate screens if respective angles of the respective vector sums are separated by at least about one degree from the problematic excitation angle.

10. The method of claim 9 wherein selecting at least two candidate screens comprises:

selecting at least two screens having respective screen frequencies and screen angles that do not combine to produce objectionable moiré.

11. The method of claim 10 wherein selecting at least two screens having respective screen frequencies and screen angles that do not combine to produce objectionable moiré comprises:

selecting at least three screens that meet a perfect zero frequency moiré condition.

12. The method of claim 9 wherein selecting a set of at least two candidate screens comprises:

at least one of selecting at least two dot screens and selecting at least one non-orthogonal screens.

13. The method of claim 12 wherein selecting at least one non-orthogonal screen comprises:

selecting at least two non-orthogonal screens that are each within about eight degrees of orthogonal.

14. The method of claim 13 wherein selecting at least one non-orthogonal screens comprises:

selecting a screen oriented within about eight degrees of at least one of 15, 45, and 75 degrees.

15. A set of halftone screens for avoiding objectionable moiré when used in conjunction with a problematic excitation, the set of halftone screens comprising:

a first screen having respective first screen fundamental frequencies, respective first screen harmonics and respective first screen angles associated with the respective first screen fundamental frequencies and harmonics; and a second screen having respective second screen fundamental frequencies, respective second screen harmonics and respective second screen angles associated with the respective second screen fundamental frequencies and harmonics, wherein the respective first and second screen angles are separated from an angle of the problematic excitation by at least about 1 degree, and wherein angles of beats, between any of the first and second screen fundamentals and harmonics that would otherwise beat with the problematic excitation at visually objectionable frequencies, are separated from the angle of the problematic excitation by at least about 1 degree.

16. The set of halftone screens of claim 15 further comprising:

a third screen having respective third screen fundamental frequencies, respective third screen harmonics and respective third screen angles associated with the respective third screen fundamental frequencies and harmonics, wherein the respective first, second and third screen angles are separated from the angle of the problematic excitation by at least about 1 degree, and wherein angles of beats, between any of the first, second and third screen fundamentals, harmonics and beats thereof that would otherwise beat with the problematic excitation at visually objectionable frequencies, are separated from the angle of the problematic excitation by at least about 1 degree.

17. The set of halftone screens of claim 16 further comprising:

a respective plurality of additional screens having a respective plurality of screen fundamental frequencies, respective plurality of screen harmonics and respective plurality of screen angles associated with the respective plurality of screen fundamental frequencies and harmonics, wherein the respective first, second and plurality of screen angles are separated from the angle of the problematic excitation by at least about 1 degree, and wherein angles of beats, between any of the first, second and plurality of screen fundamentals, harmonics and beats thereof that would otherwise beat with the problematic excitation at visually objectionable frequencies, are separated from the angle of the problematic excitation by at least about 1 degree.

18. The set of halftone screens of claim 16 wherein the first screen has a first screen fundamental frequency of 160.1 cycles per inch and a first screen angle of 38.7 degrees and a second screen fundamental frequency of 187.5 cycles per inch and a second screen angle of −53.1 degrees, the second screen has a first screen fundamental frequency of 164.4 cycles per inch and a first screen angle of −70.1 degrees and a second screen fundamental frequency of 175.3 cycles per inch and a second screen angle of 5.1 degrees and the third screen has a first screen fundamental frequency of 187.6 cycles per inch and a first screen angle of −17.1 degrees and a second screen fundamental frequency of 176.8 cycles per inch and a second screen angle of 69.4 degrees.

19. A color image processing system, the system comprising:
a set of halftone screens including a first screen having respective first screen fundamental frequencies, respective first screen harmonics and respective first screen fundamental and harmonic angles associated with the respective first screen fundamental frequencies and harmonics and a second screen having respective second screen fundamental frequencies, respective second screen harmonics and respective second screen fundamental and harmonic angles associated with the respective second screen fundamental frequencies and harmonics, wherein the respective first and second screen fundamental and harmonic angles are separated from an angle of a problematic excitation by at least about 1 degree, and wherein angles of beats between any of the first and second screen fundamentals and harmonics that would otherwise beat with the problematic excitation in a visually objectionable manner, are separated from the angle of the problematic excitation by at least about 1 degree; and
a halftoner that is operative to prepare the color image for rendering by a rendering device by using the set of halftone screens to halftone the image.

20. The color image processing system of claim 19 wherein the set of halftone screens further comprises:
a third screen having respective third screen fundamental frequencies, respective third screen harmonics and respective third screen fundamental and harmonic angles associated with the respective third screen fundamental frequencies and harmonics, wherein the respective first, second and third screen fundamental and harmonic angles are separated from the angle of the problematic excitation by at least about 1 degree, and wherein angles of beats between any of the first, second and third screen fundamentals, harmonics and beats thereof, that would otherwise beat with the problematic excitation in a visually objectionable manner, are separated from the angle of the problematic excitation by at least about 1 degree.

21. The color image processing system of claim 19 wherein the set of halftone screens further comprises:
a respective plurality of additional screens having a respective plurality of screen fundamental frequencies, respective plurality of screen harmonics and respective plurality of screen fundamental and harmonic angles associated with the respective plurality of screen fundamental frequencies and harmonics, wherein the respective first, second and plurality of screen fundamental and harmonic angles are separated from the angle of the problematic excitation by at least about 1 degree, and wherein angles of beats between any of the first, second and plurality of screen fundamentals, harmonics and beats thereof, that would otherwise beat with the problematic excitation in a visually objectionable manner, are separated from the angle of the problematic excitation by at least about 1 degree.

22. The color image processing system of claim 19 wherein the halftoner that is operative to prepare the color image for rendering by a rendering device comprising:
at least one xerographic marking engine.

23. The color image processing system of claim 19 further comprising:
a problematic excitation identifier that is operative to identify the problematic excitation from an aspect of the image process or from the color image;
a screen set selector that is operative to select the set of screens, based on the problematic excitation identified by the problematic excitation identifier, for the halftoner.

* * * * *